United States Patent [19]
Schmitz et al.

[11] Patent Number: 6,014,984
[45] Date of Patent: Jan. 18, 2000

[54] VALVE

[75] Inventors: Jean-Claude Schmitz, Heisdorf; Léon Kerger, Helmdange, both of Luxembourg

[73] Assignee: Luxembourg Patent Company, S.A., Luxembourg

[21] Appl. No.: 08/984,836

[22] Filed: Dec. 4, 1997

[30] Foreign Application Priority Data

Dec. 13, 1996 [LU] Luxembourg .............................. 88 853

[51] Int. Cl.⁷ .......................... F16K 43/00; F16K 31/60; F16K 41/02

[52] U.S. Cl. .............................. 137/315; 16/441; 74/548; 74/553; 251/214; 251/291; 251/292; 403/17; 403/361

[58] Field of Search ............................ 137/315; 251/214, 251/215, 218, 264, 266, 291, 292; 16/432, 441; 74/543, 548, 552, 553; 403/17, 345, 361

[56] References Cited

U.S. PATENT DOCUMENTS

| | | |
|---|---|---|
| 682,688 | 9/1901 | Hart ........................................ 251/214 |
| 1,548,018 | 8/1925 | Angell ..................................... 251/214 |
| 2,770,443 | 11/1956 | Rand ....................................... 251/218 |
| 2,979,076 | 4/1961 | Kish ....................................... 251/292 |
| 3,064,674 | 11/1962 | Carfagna ................................. 251/214 |
| 3,237,917 | 3/1966 | Kunzer ................................... 251/214 |
| 3,239,191 | 3/1966 | Widera ................................... 251/214 |
| 4,026,516 | 5/1977 | Matousek ................................ 251/214 |
| 4,408,745 | 10/1983 | Swiers et al. .......................... 251/215 |
| 4,616,673 | 10/1986 | Bondar ................................... 251/291 |
| 4,617,957 | 10/1986 | Sandling ................................ 251/214 |
| 4,794,945 | 1/1989 | Reback ...................................... 16/441 |
| 4,860,784 | 8/1989 | Petersen et al. ....................... 251/214 |
| 4,876,766 | 10/1989 | Cohen .................................... 251/292 |
| 4,928,919 | 5/1990 | Daicho et al. ......................... 251/291 |

Primary Examiner—George L. Walton
Attorney, Agent, or Firm—Leydig, Voit & Mayer

[57] ABSTRACT

The valve comprises an operating wheel connected by a connecting rod to an opening and closing member. The valve is sealed by a stuffening box fixed into the upper part of the body around the rod. The stuffening box has a polygonal head so that it can be screwed and unscrewed. However the head is not accessible using a conventional spanner so as to prevent a non-specialist form slackening of the stuffing box and avoid him risking an accident.

39 Claims, 1 Drawing Sheet

100# VALVE

FIELD OF THE INVENTION

The present invention relates to a valve comprising a body, an internal opening and closing member, an external operating wheel connected by a connecting rod directly or indirectly to the opening and closing member, a stuffing box through which the said rod passes and which is screwed in leaktight manner into the body of the valve, the said stuffing box having a head to be screwed or unscrewed using an appropriate tool.

BACKGROUND OF THE INVENTION

The invention is targeted more specifically, without being restricted thereto, to valves for bottles of gas of all kinds, such as propane, butane or the like. These valves generally seal by means of the stuffing box which surrounds the upper part of the rod connecting the operating wheel with the closure member. These valves can be removed by unscrewing the stuffing box and taking it out of the body of the valve. For this, the stuffing box of known valves has a polygonal head, for example a hexagonal head, which is readily accessible underneath the operating wheel using a conventional spanner. This accessibility for slackening off the stuffing box may, however, constitute a serious hazard when a non-specialist attempts to "have a go" when the valve is on the bottle and the bottle is not empty. What may, for example, happen is that, observing a slight leak, someone may attempt to remedy this by trying to tighten the stuffing box. In this case, a mistake in the direction of rotation, especially when the stuffing box has a left-hand thread, may become the cause of serious accidents.

SUMMARY OF THE INVENTION

The purpose of the present invention is to provide a new valve which cannot be removed or slackened off except by a recognized specialist in possession of a non-conventional appropriate tool, that is to say of a tool that is not commercially available.

In order to achieve this objective, the present invention proposes a valve of the sort described hereinabove which is characterized in that there is a peripheral skirt completely surrounding the head of the stuffing box and preventing lateral access thereto, in that the wheel has at least two perforations and in that the said appropriate tool has claws the cross section of which complements the said perforations and the head of the stuffing box so that they can pass through the operating wheel and engage with the head of the stuffing box.

The said peripheral skirt preferably forms an integral part of the wheel.

This tool is a non-conventional tool specially designed for the valve according to the present invention and which can be possessed only by specialists able to open the valve.

This tool may be a socket wrench in which the socket has cutouts along the generatrix defining the said claws. The tool preferably has three claws corresponding to three perforations in the wheel.

The tool may also be an accessory intended merely to prevent the wheel from rotating independently of the stuffing box so that the latter can be screwed and unscrewed using the wheel.

The wheel may form an integral part of the connecting rod or be screwed onto the latter using a screw that cannot be unscrewed with a conventional screwdriver.

Other particular features of the invention will emerge from the detailed description of a preferred embodiment presented below, by way of illustration, with reference to the appended drawings.

DETAILED DESCRIPTION OF THE PREFERRED EMBODIMENT

Figure 1:
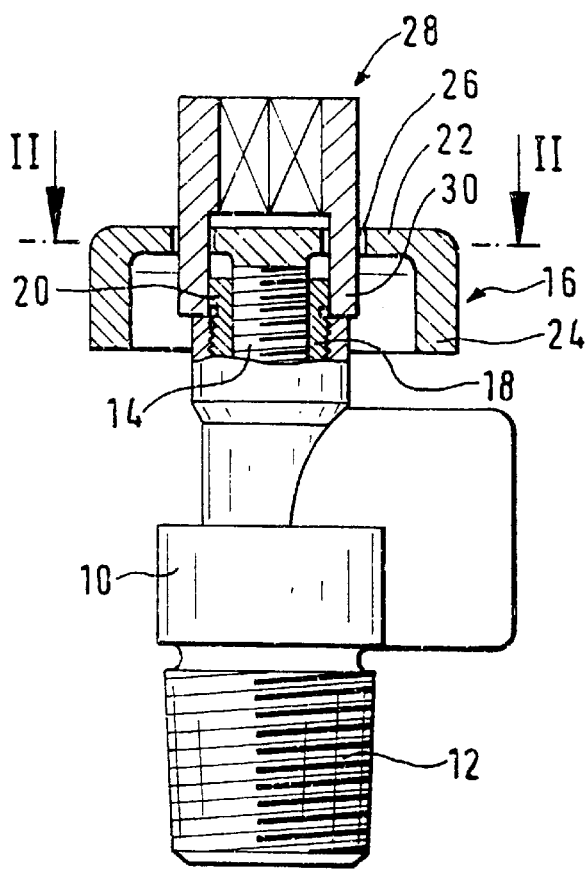
FIG. 1 diagrammatically depicts a valve according to the present invention, in vertical part section.

The valve depicted in FIG. 1 has a body 10, for example made of metal, the lower part of which has a thread 12 allowing it to be screwed onto a gas bottle, not shown. Inside the body 10 and not visible in the figure there is an opening and closing member known per se which is connected directly or indirectly by a connecting rod 14 to an external operating wheel, the rotation of which allows the valve to be opened or closed.

A stuffing box 18 is fixed into the upper part or neck of the body 10 around the rod 14 and seals the valve with respect to the outside. This stuffing box 18 has a polygonal head 20, for example a hexagonal head, so that it can be screwed and unscrewed. The valve according to the present invention is designed so that this head is not accessible using a conventional spanner so as to prevent a non-specialist from slackening off the stuffing box and avoid him risking an accident.

For this, the operating wheel 16 is in the form of a cap, that is to say that it comprises a plate or disc 22 and a peripheral cylindrical skirt 24 that completely surrounds the neck of the body 10 and thus prevents any lateral access to the head 20 of the stuffing box 18.

Figure 2:
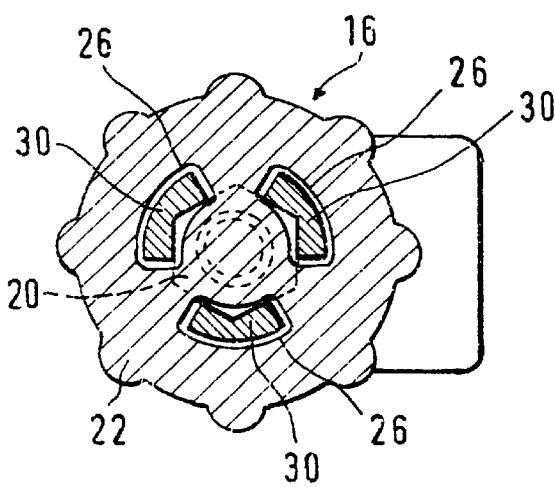
FIG. 2 is a view looking down on the head of the valve of FIG. 1.

Access to the stuffing box 18 is possible only using a special accessory available only to those authorized to tighten and slacken off the stuffing box. In accordance with the present invention, this access is gained through the operating wheel 16. For this, the disc 22 of this component comprises, as can be seen in FIG. 2, at least two, and in the example depicted three, symmetric perforations 26 extending as arcs of a circle around the centre of the wheel. The accessory in the example depicted may consist of a cylindrical socket 28 the lower part of which consists of three claws 30 the cross sections of which complement those of the perforations 26. The internal face of the three claws 30 defines a hexagonal cylindrical surface that complements the hexagonal contour of the head 20 of the stuffing box 18. The socket 28 may be a conventional socket for screw heads in which cutouts have been made in the lower part along the generatrix to define the claws 30. The top of the socket 28 may have a cavity of square section or some other section to take the head, of complementary section, of a lever or knob for turning the socket 28. This socket 28 may also be integral with this lever, that is to say of the box spanner type.

To slacken off or tighten the stuffing box, all that is then required is for the socket 28 to penetrate with its claws 30 through the perforations 26 in the wheel 16 to engage with the hexagonal head 20 of the stuffing box and turn it in the desired direction. The claws 30 pass through the perforations 26, preferably with a small amount of clearance so that they do not come away from the head 20 of the stuffing box under the effect of the force of turning.

It is also possible for just two claws and two perforations to be provided, these possibly having a larger cross section than the one depicted. It is even possible to envisage a number of claws and perforations higher than three but, in order not to reduce the cross section of the claws and their strength, it is preferable that the number envisaged should not exceed three.

According to another embodiment, it is possible for the accessory, for example the socket 28, to be used merely for securing the wheel 16 in the turning sense to the stuffing box 18. The latter can then be tightened or slackened off by turning the wheel 16. In this case, it is however preferable for an appropriate tool to be available, allowing enough turning force to be exerted on the wheel 16.

Figure 3:
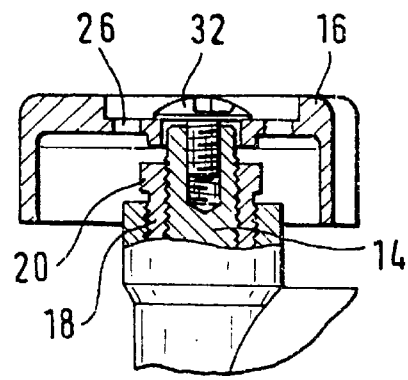
FIG. 3 shows a part view of an alternative form of valve according to the present invention.

In the example depicted in FIG. 1, the wheel 16 forms an integral part of the rod 14 and is therefore made of the same material as the latter. FIG. 3 depicts an alternative form in which the wheel 16 is screwed onto the rod 14, which allows the use of different materials, for example a wheel 16 made of synthetic material. The wheel 16 is fixed to the rod 14 using a screw 32. To prevent access to the stuffing box 18 by first of all removing the wheel 16, use is made of a screw 32 that can be tightened but that cannot be slackened off. All that is required to achieve this is simply for the screwdriver slot to be widened in the slackening-off direction. Access to the stuffing box is the same as it was in FIGS. 1 and 2.

All that remains to be noted is that the invention is not restricted to the preferred embodiment described hereinabove with reference to the figures. Thus, for example, the skirt 24 instead of forming part of the wheel 16 can form part of the body 10, the essential feature being that it prevents access to the head 20 of the stuffing box.

The head 20 of the stuffing box 18 need not necessarily have a polygonal cross section. It may just as easily have cutouts corresponding to the claws of the tool to allow these to penetrate.

What is claimed is:

1. A valve comprising a body, an internal opening and closing member, an external operating wheel connected by a connecting rod directly or indirectly to the opening and closing member, a stuffing box through which the said rod passes and which is screwed in leaktight manner into the body of the valve, the said stuffing box having a head that can be operated on using an appropriate tool to be screwed or unscrewed, wherein there is a peripheral skirt associated with at least one of the valve body or the operating wheel and completely surrounding the head of the stuffing box and preventing lateral access thereto, in that the wheel has at least two perforations and in that the said appropriate tool has claws, a cross section of which complements the said perforations and the head of the stuffing box so that they can pass through the operating wheel and engage with the head of the stuffing box.

2. The valve according to claim 1, wherein the peripheral skirt forms part of the wheel.

3. The valve according to claim 1, wherein the head of the stuffing box has a polygonal cross section.

4. The valve according to claim 2, wherein the head of the stuffing box has a polygonal cross section.

5. The valve according to claim 3, wherein the tool is a conventional socket wrench in which cutouts have been made along the generatrix of the socket defining the said claws.

6. The valve according to claim 4, wherein the tool is a conventional socket wrench in which cutouts have been made along the generatrix of the socket defining the said claws.

7. The valve according to claim 1, wherein the tool has three claws corresponding to three perforations in the wheel.

8. The valve according to claim 2, wherein the tool has three claws corresponding to three perforations in the wheel.

9. The valve according to claim 3, wherein the tool has three claws corresponding to three perforations in the wheel.

10. The valve according to claim 4, wherein the tool has three claws corresponding to three perforations in the wheel.

11. The valve according to claim 5, wherein the tool has three claws corresponding to three perforations in the wheel.

12. The valve according to claim 6, wherein the tool has three claws corresponding to three perforations in the wheel.

13. The valve according to claim 1, wherein the tool is an accessory intended to prevent the wheel from rotating independently of the stuffing box so that the latter can be screwed and unscrewed using the wheel.

14. The valve according to claim 1, wherein the wheel forms an integral part of the rod.

15. The valve according to claim 2, wherein the wheel forms an integral part of the rod.

16. The valve according to claim 3, wherein the wheel forms an integral part of the rod.

17. The valve according to claim 4, wherein the wheel forms an integral part of the rod.

18. The valve according to claim 5, wherein the wheel forms an integral part of the rod.

19. The valve according to claim 6, wherein the wheel forms an integral part of the rod.

20. The valve according to claim 7, wherein the wheel forms an integral part of the rod.

21. The valve according to claim 8, wherein the wheel forms an integral part of the rod.

22. The valve according to claim 9, wherein the wheel forms an integral part of the rod.

23. The valve according to claim 10, wherein the wheel forms an integral part of the rod.

24. The valve according to claim 11, wherein the wheel forms an integral part of the rod.

25. The valve according to claim 12, wherein the wheel forms an integral part of the rod.

26. The valve according to claim 13, wherein the wheel forms an integral part of the rod.

27. The valve according to claim 1, wherein the wheel is screwed onto the rod using a screw that cannot be unscrewed.

28. The valve according to claim 2, wherein the wheel is screwed onto the rod using a screw that cannot be unscrewed.

29. The valve according to claim 3, wherein the wheel is screwed onto the rod using a screw that cannot be unscrewed.

30. The valve according to claim 4, wherein the wheel is screwed onto the rod using a screw that cannot be unscrewed.

31. The valve according to claim 5, wherein the wheel is screwed onto the rod using a screw that cannot be unscrewed.

32. The valve according to claim 6, wherein the wheel is screwed onto the rod using a screw that cannot be unscrewed.

33. The valve according to claim 7, wherein the wheel is screwed onto the rod using a screw that cannot be unscrewed.

34. The valve according to claim 8, wherein the wheel is screwed onto the rod using a screw that cannot be unscrewed.

35. The valve according to claim 9, wherein the wheel is screwed onto the rod using a screw that cannot be unscrewed.

36. The valve according to claim 10, wherein the wheel is screwed onto the rod using a screw that cannot be unscrewed.

37. The valve according to claim 11, wherein the wheel is screwed onto the rod using a screw that cannot be unscrewed.

38. The valve according to claim 12, wherein the wheel is screwed onto the rod using a screw that cannot be unscrewed.

39. The valve according to claim 13, wherein the wheel is screwed onto the rod using a screw that cannot be unscrewed.

* * * * *